Aug. 31, 1926.
T. G. ALLEN
1,597,664
SYSTEM OF RAISING LIQUIDS
Filed May 1, 1923
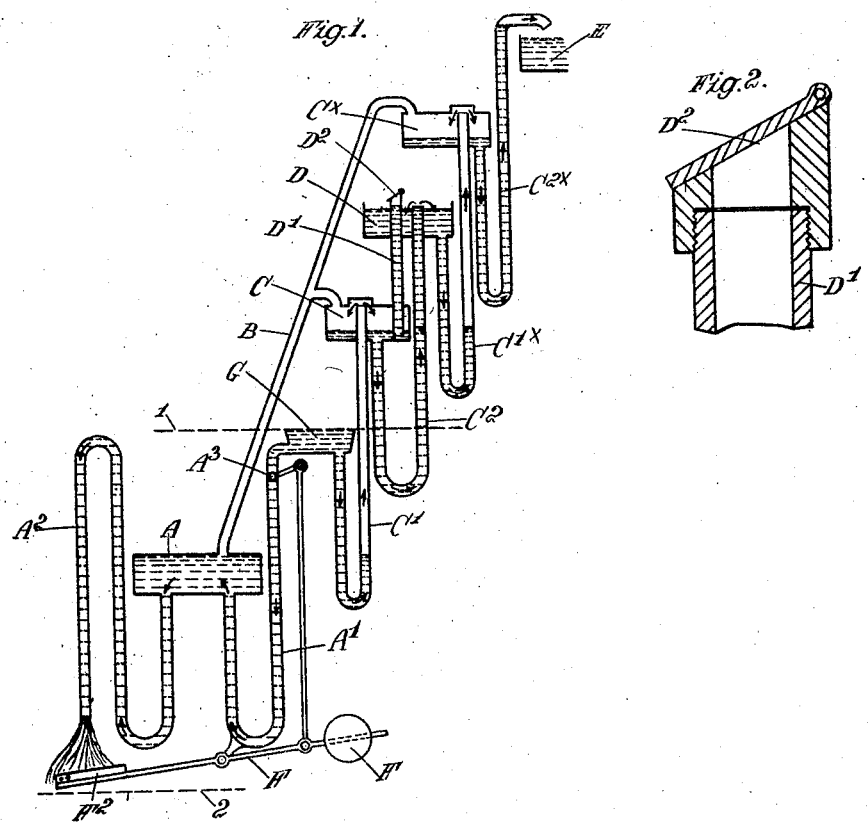

Patented Aug. 31, 1926.                                               1,597,664

UNITED STATES PATENT OFFICE.

THOMAS GASKELL ALLEN, OF WESTMINSTER, ENGLAND, ASSIGNOR, BY MESNE ASSIGNMENTS, TO HYDRAUTOMAT, LIMITED, OF LONDON, ENGLAND.

SYSTEM OF RAISING LIQUIDS.

Application filed May 1, 1923, Serial No. 635,836, and in Great Britain June 9, 1922, and August 21, 1922.

This invention relates to a system of raising liquids from a closed container by the intermediary of a column of air or other gaseous medium (hereinafter referred to as air) which is displaced by the entry of water under static pressure into an operating chamber in communication with the air conduit, as distinct from those systems in which air under pressure is admitted to the closed container for forcing the liquid out, the air in such systems being released automatically to enable the liquid to enter the container for the next forcing operation. The invention is particularly applicable to the system forming the subject of my Patent No. 1,444,442 in which the air is displaced by means of static pressure obtained from a river, canal or other body of water, a portion of which is either naturally situated, or is artificially maintained, at a higher level than the rest, the said system comprising a tank or other closed operating chamber which is alternately filled with water and emptied under the influence of static pressure resulting from the head of water due to the difference in water levels, and which is connected by a conduit containing the air to a container arranged above the level of the liquid to be raised, the said container having a downwardly extending conduit which communicates with the said liquid and through which liquid is sucked into the container during the emptying of the operating chamber and the said container also having an upwardly extending conduit through which the liquid is forced from the container during the filling of the said operating chamber.

In all such systems in which the operating air is displaced by the entry of water under static pressure into an operating chamber varying small quantities of air bubbles are carried in with the water from the atmosphere into the operating chamber during the forcing operation; these air bubbles are subsequently liberated and accumulate in the portion of the system containing the operating air and gradually lead to undesirable increase in the total volume of this air with consequential diminution in the efficiency of the system.

According to the present invention, in order to obviate the disadvantages resulting from the aforesaid accumulation of air, I provide a device which serves to temporarily place the portion of the system containing the operating air in communication with the atmosphere at or near the termination of a forcing operation. The said device may come into action automatically only when there is an excess of the air from the cause mentioned above, or it may be operated automatically irrespective of whether or not there is any such excess at any particular time.

In order that the said invention may be clearly understood and readily carried into effect, the same will now be described more fully with reference to the accompanying drawing, in which:—

Figure 1 is a diagrammatic view shewing by way of example the system in accordance with my English Patent No. 181,762 provided with one form of the aforesaid device, and Figure 2 is a section on a larger scale of the device shewn in Figure 1.

In the drawings A is the operating chamber situated between the high level water 1 and the low level water 2 and provided with a water sealed inlet pipe A′ leading from a trough G fed from the high level water, and also provided with a water sealed siphon pipe $A^2$ for the outlet of water from the said chamber A. A valve $A^3$ in the inlet pipe A′ controls the entry of water to the chamber A and this valve is operated automatically by a pivoted lever F having a weight F′ at one end and a platform $F^2$ at the other end upon which the water from the outlet pipe $A^2$ falls. B is the air conduit communicating with the operating chamber A and closed containers C and $C^x$, D is an intermediate open vessel and E is the reservoir. The closed container C communicates with the liquid to be raised (which is assumed to be the water in the trough G) by a liquid-sealed pipe C′ and with the intermediate open vessel D by another liquid-sealed pipe $C^2$. The closed container $C^x$ communicates with the vessel D by a liquid-sealed pipe $C'^x$ and with the reservoir E by another liquid-sealed pipe $C^{2x}$. The operation of this apparatus is fully described in the specification of my aforesaid English Patent No. 181762.

The aforesaid automatic air release device comprises in the example shewn by Figures 1 and 2, a pipe D' extending upwardly from the closed container C with its lower end situated at or slightly below the normal level of the liquid in this container at the termination of a forcing operation, this normal level being arranged (by making the container C of suitable size) to be approximately as shewn in Figure 1. The upper part of this pipe has a non-return valve $D^2$ (such as the inclined flap valve shewn in Figure 2 or a ball valve made of rubber composition only slightly heavier than water) and leads into the intermediate open vessel D, the upper end of this pipe being situated slightly above the high level position of the liquid in this vessel. The arrangement is such that when there is an accumulation of air as aforesaid, the liquid in the closed container C will, at or near the termination of a forcing operation, be depressed below the lower end of the pipe D' and as the liquid in this pipe is then no longer sealed, it will descend into the container as the air escapes through the pipe past the non-return valve $D^2$ to the atmosphere. Any liquid passing out with the air will enter the intermediate open vessel D and be added to the liquid that is being raised. This action will occur automatically at or towards the end of a forcing operation whenever there is any undesirable accumulation of air in the system. It will be understood that only one pipe D' and valve $D^2$ are required however many lifting stages there may be. The valve $D^2$ prevents any atmospheric air from entering the pipe D' when the latter is unsealed and the suction operation commences. In an alternative arrangement the pipe D' may also be utilized for conveying liquid from the container C or the container $C^x$ (but not both) in place of the sealed pipe $C^2$ or $C^{2x}$.

My present improvements can be employed in conjunction with any system in which the liquid is raised through the intermediary of a column of air displaced by pressure derived from a head of water whether the pressure be employed alone for this purpose or in conjunction with suction operating alternately with the pressure upon the same column of gaseous medium or simultaneously with the pressure upon a separate column of gaseous medium.

What I claim and desire to secure by Letters Patent of the United States is:—

1. A system of raising liquid, comprising a closed container supplied with said liquid, an air conduit leading to said container, means for exerting the pressure of a head of water on the air in said conduit to force the liquid from said container, a pipe extending upwardly from said container with its lower end at or slightly below the normal level of the liquid in said container at the termination of a forcing operation and a non-return valve in said pipe.

2. A system of raising a liquid, comprising a closed container supplied with said liquid, an air conduit leading to said container, means for exerting the pressure of a head of water on the air in said conduit to force the liquid from said container, a pipe through which said forced liquid passes, a second pipe extending upwardly from said container with its lower end at or slightly below the normal level of the liquid in said container at the termination of a forcing operation and a non-return valve in said second pipe.

3. A system of raising a liquid, comprising a closed container arranged above the level of the liquid to be raised, a downwardly extending conduit leading from said container to the liquid to be raised, an upwardly extending conduit for conveying liquid from said container, an air conduit leading to said container, means for exerting on the air in said air conduit alternate suction and pressure derived from negative and positive heads of water to suck liquid into said container and force it therefrom, a pipe extending upwardly from said container with its lower end slightly below the normal level of the liquid in said container at the termination of a forcing operation and a non-return valve in said pipe.

4. A system of raising a liquid by means of a body of water a portion of which is situated at a higher level than the rest, comprising an operating chamber, means for filling said chamber under the influence of static pressure resulting from the head of water due to the difference in water levels, a closed container supplied with the liquid to be raised, an air conduit interposed between said operating chamber and said container, a pipe extending upwardly from said container with its lower end slightly below the normal level of the liquid in said container at the termination of a forcing operation and a non-return valve in said pipe.

5. A system of raising a liquid by means of a body of water a portion of which is situated at a higher level than the rest, comprising an operating chamber, means for alternately filling said chamber with water and emptying it under the influence of static pressure resulting from the head of water due to the difference in water levels, a closed container arranged above the level of the liquid to be raised, a downwardly extending conduit which leads from said container to the liquid to be raised and through which this liquid is lifted into said container by the suction created by the emptying of said operating chamber, a conduit through which liquid is forced from said container by the pressure created by the filling of said operating chamber, a pipe extending upwardly from said container with its lower end slightly below the normal level of the liquid in said container at the termination of a forcing operation, and a non-return valve in said pipe.

6. A system of raising a liquid by means of a body of water a portion of which is situated at a higher level than the rest, comprising an operating chamber, means for alternately filling said chamber with water and emptying it under the influence of static pressure resulting from the head of water due to the difference in water levels, two closed containers arranged at different heights above the level of the liquid to be raised, an air conduit connecting said operating chamber with each of said containers, an intermediate open vessel situated between said containers, an upwardly extending conduit connecting said vessel with the container above it, a downwardly extending conduit connecting said vessel with the container below it, a downwardly extending conduit which leads from the lower container to the liquid to be raised, a conduit extending upwardly from the upper container, a pipe extending upwardly from one of said containers with its lower end slightly below the normal level of the liquid in said container at the end of a forcing operation and a non-return valve in said pipe.

THOMAS GASKELL ALLEN.